(12) United States Patent
Oota et al.

(10) Patent No.: US 11,545,056 B2
(45) Date of Patent: Jan. 3, 2023

(54) LUMINOUS CURVED GLASS AND CURVED DIGITAL SIGNAGE

(71) Applicant: SEKISUI CHEMICAL CO., LTD., Osaka (JP)

(72) Inventors: Yuusuke Oota, Shiga (JP); Yasuyuki Izu, Roermond (NL); Daisuke Nakajima, Shiga (JP)

(73) Assignee: SEKISUI CHEMICAL CO., LTD., Osaka (JP)

( * ) Notice: Subject to any disclaimer, the term of this patent is extended or adjusted under 35 U.S.C. 154(b) by 99 days.

(21) Appl. No.: 16/477,569

(22) PCT Filed: Mar. 27, 2018

(86) PCT No.: PCT/JP2018/012422
§ 371 (c)(1),
(2) Date: Jul. 12, 2019

(87) PCT Pub. No.: WO2018/181305
PCT Pub. Date: Oct. 4, 2018

(65) Prior Publication Data
US 2019/0371216 A1    Dec. 5, 2019

(30) Foreign Application Priority Data
Mar. 29, 2017  (JP) .............................. JP2017-066004

(51) Int. Cl.
*G09F 13/20*  (2006.01)
*B32B 1/00*   (2006.01)
(Continued)

(52) U.S. Cl.
CPC ................ *G09F 13/20* (2013.01); *B32B 1/00* (2013.01); *B32B 17/10036* (2013.01);
(Continued)

(58) Field of Classification Search
None
See application file for complete search history.

(56) References Cited

U.S. PATENT DOCUMENTS 2,689,189 A    9/1954  Hushley
4,292,107 A *  9/1981  Tanaka .................. G03F 7/0007
                                                      252/301.36
(Continued)

FOREIGN PATENT DOCUMENTS

BR    PI 0410724-1    6/2006
CN       104220253    12/2014
(Continued)

OTHER PUBLICATIONS

Extended European Search Report dated Nov. 16, 2020 in corresponding European Patent Application No. 18775218.3.
(Continued)

*Primary Examiner* — Ramsey Zacharia
(74) *Attorney, Agent, or Firm* — Wenderoth, Lind & Ponack, L.L.P.

(57) ABSTRACT

The present invention aims to provide a luminescent curved glass which, despite being curved with a small radius of curvature, can provide a clear display on its entire surface when irradiated with light, and curved digital signage including the luminescent curved glass. Provided is a luminescent curved glass including a laminate including a transparent plate having a radius of curvature of 3,000 mm or lower and a luminescent sheet, the luminescent sheet containing a thermoplastic resin and a luminescent material that emits visible light having a wavelength of 380 to 750 nm under excitation light.

9 Claims, 1 Drawing Sheet

(51) Int. Cl.
  *B32B 17/10* (2006.01)
  *B32B 27/30* (2006.01)
  *G03B 21/60* (2014.01)
  *G09F 23/04* (2006.01)
  *B32B 27/08* (2006.01)
  *B32B 27/22* (2006.01)
  *B32B 27/40* (2006.01)
  *B32B 27/18* (2006.01)
  *G03B 21/56* (2006.01)

(52) U.S. Cl.
  CPC .. *B32B 17/10431* (2013.01); *B32B 17/10761* (2013.01); *B32B 27/30* (2013.01); *G03B 21/60* (2013.01); *G09F 23/04* (2013.01); *B32B 2307/422* (2013.01); *B32B 2329/06* (2013.01); *B32B 2419/00* (2013.01); *B32B 2551/00* (2013.01); *B32B 2590/00* (2013.01)

(56) References Cited

U.S. PATENT DOCUMENTS

| | | | |
|---|---|---|---|
| 5,217,794 A * | 6/1993 | Schrenk | B29C 48/07 428/220 |
| 2002/0120916 A1 | 8/2002 | Snider, Jr. | |
| 2004/0000168 A1 | 1/2004 | Vandal | |
| 2011/0273874 A1 | 11/2011 | Veral-Debailleul et al. | |
| 2011/0318578 A1 * | 12/2011 | Hashimoto | B32B 17/10678 428/354 |
| 2012/0068083 A1 | 3/2012 | Labrot et al. | |
| 2014/0355107 A1 * | 12/2014 | Taima | B32B 37/144 359/359 |
| 2015/0072125 A1 | 3/2015 | Murashige et al. | |
| 2015/0258750 A1 * | 9/2015 | Kang | B29C 65/54 428/174 |
| 2015/0316838 A1 | 11/2015 | Laluet et al. | |
| 2015/0323716 A1 | 11/2015 | Greb et al. | |
| 2016/0011414 A1 | 1/2016 | Joseph | |
| 2017/0197386 A1 | 7/2017 | Oota et al. | |
| 2017/0287369 A1 | 10/2017 | Oota et al. | |

FOREIGN PATENT DOCUMENTS

| | | |
|---|---|---|
| CN | 106458745 | 2/2017 |
| CN | 106470837 | 3/2017 |
| JP | 52-44834 | 4/1977 |
| JP | 4-502525 | 5/1992 |
| JP | 3150304 | 5/2009 |
| JP | 2010-013311 | 1/2010 |
| JP | 2011-213568 | 10/2011 |
| JP | 2014-224012 | 12/2014 |
| JP | 2016-045374 | 4/2016 |
| JP | 2016-069216 | 5/2016 |
| JP | 2016-519774 | 7/2016 |
| WO | 91/06031 | 5/1991 |
| WO | 2004/110747 | 12/2004 |
| WO | 2010/139889 | 12/2010 |
| WO | 2016/017825 | 2/2016 |

OTHER PUBLICATIONS

International Preliminary Report on Patentability dated Sep. 3, 2019 in International (PCT) Patent Application No. PCT/JP2018/012422.
International Search Report dated Jun. 12, 2018 in International (PCT) Application No. PCT/JP2018/012422.

* cited by examiner

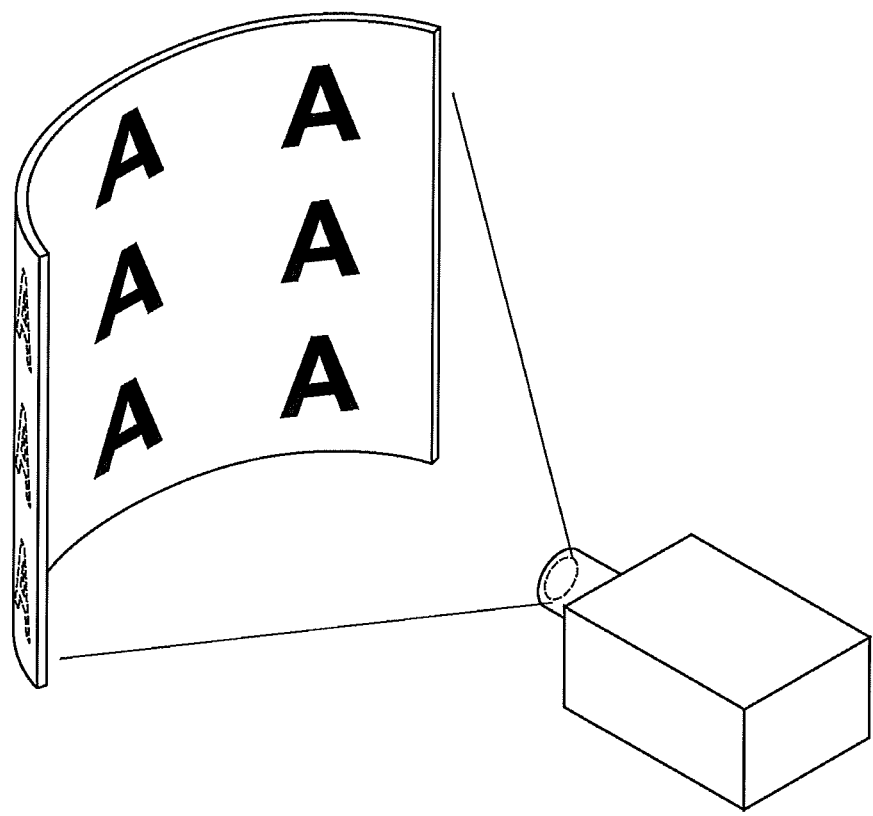

LUMINOUS CURVED GLASS AND CURVED DIGITAL SIGNAGE

TECHNICAL FIELD

The present invention relates to a luminescent curved glass which, despite being curved with a small radius of curvature, can provide a clear display on its entire surface when irradiated with light, and curved digital signage including the luminescent curved glass.

BACKGROUND ART

Public facilities such as stations and airports and commercial facilities such as department stores have deployed digital signage. Digital signage displays videos and still images on the display to present various kinds of information. Digital signage typically includes liquid crystal displays or plasma displays (for example, Patent Literature 1). Large digital signage including liquid crystal displays or the like, however, is very expensive.

Such a situation has led to the use of methods in which images are projected from an image projector onto specially processed glass or the like as a screen.

In recent years, complex-shaped digital signage exhibiting higher design quality has been demanded. Moreover, digital signage screens are sometimes arranged utilizing building pillars. Screens having a curved shape with a small radius of curvature, including such a complex shape or a pillar shape, have difficulty in providing a clear display on their entire surface when images are projected thereon.

CITATION LIST

Patent Literature

Patent Literature 1: JP H04-502525 T

SUMMARY OF INVENTION

Technical Problem

In view of the above situation in the art, the present invention aims to provide a luminescent curved glass which, despite being curved with a small radius of curvature, can provide a clear display on its entire surface when irradiated with light, and curved digital signage including the luminescent curved glass.

Solution to Problem

The present invention relates to a luminescent curved glass including a laminate including a transparent plate having a radius of curvature of 3,000 mm or lower and a luminescent sheet, the luminescent sheet containing a thermoplastic resin and a luminescent material that emits visible light having a wavelength of 380 to 750 nm under excitation light.

The present invention is described in detail below.

The present inventors made intensive studies to find out that various images can be displayed by irradiating, with excitation light, a laminate including a transparent plate and a luminescent sheet containing a thermoplastic resin and a luminescent material that emits visible light having a wavelength of 380 to 750 nm under excitation light. The images are not projected from an image projector, but displayed by the laminate's own light emission. Thus, unlike the case of projecting images from an image projector, a clear display can be provided on the entire surface even when the laminate is curved with a small radius of curvature.

The luminescent curved glass of the present invention includes a laminate including a transparent plate and a luminescent sheet.

The transparent plate imparts strength to the luminescent curved glass of the present invention and improves the handleability. In particular, the laminate preferably has a structure (laminated glass structure) in which the luminescent sheet is interposed between a pair of transparent plates.

The transparent plates may be transparent plate glass commonly used. Examples thereof include inorganic glass such as float plate glass, polished plate glass, molded plate glass, wired glass, wire-reinforced plate glass, colored plate glass, heat-absorbing glass, heat-reflecting glass, and green glass. Also usable is UV light-shielding glass in which a UV light-shielding coat layer is formed on the surface of glass. However, such glass is preferably used as a glass plate on a side opposite to the side irradiated with light having a specific wavelength. Moreover, organic plastic plates such as polyethylene terephthalate, polycarbonate, or polyacrylate plates may also be used.

The transparent plates used may be two or more kinds of transparent plates. Moreover, the transparent plates used may be two or more kinds of transparent plates different in the thickness.

The transparent plate is curved with a radius of curvature of 3,000 mm or lower. A transparent plate having a radius of curvature of 3,000 mm or lower can be suitably used in complex-shaped digital signage having high design quality and digital signage utilizing a building pillar. The transparent plate is preferably curved with a radius of curvature of 2,000 mm or lower, more preferably a radius of curvature of 1,000 mm or lower.

Even when the transparent plate has a radius of curvature of greater than 3,000 mm, the luminescent curved glass of the present invention can display various images under excitation light. The present invention, however, is greatly advantageous in that the luminescent curved glass can provide a clear display on its entire surface even when the transparent plate has a radius of curvature of 3,000 mm or lower.

The transparent plate may have any thickness. The lower limit thereof is preferably 1.5 mm and the upper limit thereof is preferably 15 mm. When the thickness of the transparent plate is within this range, sufficient strength and sufficient handleability can be both achieved. The lower limit of the thickness of the transparent plate is more preferably 2.0 mm and the upper limit thereof is more preferably 12 mm.

The luminescent sheet contains a thermoplastic resin and a luminescent material that emits visible light having a wavelength of 380 to 750 nm under excitation light. When the luminescent curved glass containing such a luminescent sheet is irradiated with excitation light, the luminescent curved glass itself emits light, so that it can display various images.

Any thermoplastic resin may be used, and examples thereof include polyvinyl acetal resins, ethylene-vinyl acetate copolymer resins, ethylene-acryl copolymer resins, polyurethane resins, polyurethane resins containing sulfur element, polyvinyl alcohol resins, vinyl chloride resins, and polyethylene terephthalate resins. Suitable among these are polyvinyl acetal resins because a polyvinyl acetal resin used in combination with a plasticizer can exhibit excellent adhesion to a transparent plate.

The polyvinyl acetal resin may be any polyvinyl acetal resin obtained by acetalization of polyvinyl alcohol with an aldehyde, and is preferably polyvinyl butyral. Two or more kinds of polyvinyl acetal resins may be used in combination as needed.

The lower limit of the degree of acetalization of the polyvinyl acetal resin is preferably 40 mol % and the upper limit thereof is preferably 85 mol %. The lower limit is more preferably 60 mol % and the upper limit is more preferably 75 mol %.

The lower limit of the hydroxy group content of the polyvinyl acetal resin is preferably 15 mol % and the upper limit thereof is preferably 35 mol %. When the hydroxy group content is 15 mol % or more, formation of the interlayer film for a laminated glass is facilitated. When the hydroxy group content is 35 mol % or less, the luminescent sheet to be obtained is easy to handle.

The degree of acetalization and the hydroxy group content can be measured in accordance with, for example, "Testing methods for polyvinyl butyral" in JIS K 6728.

The polyvinyl acetal resin can be prepared by acetalization of polyvinyl alcohol with an aldehyde. The polyvinyl alcohol is normally prepared by saponification of polyvinyl acetate. Polyvinyl alcohol commonly used has a degree of saponification of 70 to 99.8 mol %.

The lower limit of the degree of polymerization of the polyvinyl alcohol is preferably 500 and the upper limit thereof is preferably 4,000. When the polyvinyl alcohol has a degree of polymerization of 500 or more, the laminated glass produced using the luminescent sheet to be obtained has higher penetration resistance. When the polyvinyl alcohol has a degree of polymerization of 4,000 or less, formation of the luminescent sheet is facilitated. The lower limit of the degree of polymerization of the polyvinyl alcohol is more preferably 1,000 and the upper limit thereof is more preferably 3,600.

Any aldehyde may be used, and commonly preferred is a C1-C10 aldehyde. Any C1-C10 aldehyde may be used, and examples thereof include n-butyraldehyde, isobutyraldehyde, n-valeraldehyde, 2-ethylbutyraldehyde, n-hexylaldehyde, n-octylaldehyde, n-nonylaldehyde, n-decylaldehyde, formaldehyde, acetaldehyde, and benzaldehyde. Preferred among these are n-butyraldehyde, n-hexylaldehyde, and n-valeraldehyde, and more preferred is n-butyraldehyde. These aldehydes may be used alone or in combination of two or more thereof.

The luminescent material is a luminescent material that emits visible light having a wavelength of 380 to 750 nm under excitation light. The use of such a luminescent material allows the luminescent curved glass itself to emit light under irradiation with excitation light to display various images.

The luminescent material may be any luminescent material that emits visible light having a wavelength of 380 to 750 nm under excitation light, and may be a conventionally known luminescent material. One luminescent material may be used alone, or two or more luminescent materials may be used in combination. In particular, suitable luminescent materials include a lanthanoid complex with a multidentate ligand containing a halogen atom and a luminescent material having a terephthalic acid ester structure, because they can emit light at high luminance.

Among lanthanoid complexes, the lanthanoid complex with a multidentate ligand containing a halogen atom emits light at a high intensity under irradiation with light. Examples of the lanthanoid complex with a multidentate ligand containing a halogen atom include lanthanoid complexes with a bidentate ligand containing a halogen atom, lanthanoid complexes with a tridentate ligand containing a halogen atom, lanthanoid complexes with a tetradentate ligand containing a halogen atom, lanthanoid complexes with a pentadentate ligand containing a halogen atom, and lanthanoid complexes with a hexadentate ligand containing a halogen atom.

In particular, a lanthanoid complex with a bidentate ligand containing a halogen atom or a lanthanoid complex with a tridentate ligand containing a halogen atom emits light having a wavelength of 580 to 780 nm at a significantly high intensity under irradiation with light having a wavelength of 300 to 410 nm. Owing to such high-intensity luminescence, a luminescent sheet containing the lanthanoid complex can sufficiently emit light even under very weak excitation light, and can provide particularly excellent aesthetic appearances with "blurred luminescence".

In addition, the lanthanoid complex with a bidentate ligand containing a halogen atom and the lanthanoid complex with a tridentate ligand containing a halogen atom are also excellent in heat resistance. Thus, even in the case where the luminescent sheet is used outdoors under infrared irradiation, deterioration of the luminescent material due to high temperature can be prevented.

As used herein, the lanthanoid include lanthanum, cerium, praseodymium, neodymium, promethium, samarium, europium, gadolinium, terbium, dysprosium, holmium, erbium, thulium, ytterbium, and lutetium. For even higher emission intensity, the lanthanoid is preferably neodymium, europium, or terbium, more preferably europium or terbium, still more preferably europium.

Examples of the lanthanoid complex with a bidentate ligand containing a halogen atom include tris(trifluoroacetylacetone)phenanthroline europium, tris(trifluoroacetylacetone)diphenyl phenanthroline europium, tris(hexafluoroacetylacetone)diphenyl phenanthroline europium, tris (hexafluoroacetylacetone)bis(triphenylphosphine) europium, tris(trifluoroacetylacetone)2,2'-bipyridine europium, and tris(hexafluoroacetylacetone)2,2'-bipyridine europium.

Examples of the lanthanoid complex with a tridentate ligand containing a halogen atom include terpyridine trifluoroacetylacetone europium and terpyridine hexafluoroacetylacetone europium.

Examples of the halogen atom in the lanthanoid complex with a bidentate ligand containing a halogen atom or the lanthanoid complex with a tridentate ligand containing a halogen atom include a fluorine atom, a chlorine atom, a bromine atom, and an iodine atom. Preferred is a fluorine atom for better stability of the ligand structure.

Among the lanthanoid complexes with a bidentate ligand containing a halogen atom or the lanthanoid complexes with a tridentate ligand containing a halogen atom, a lanthanoid complex with a bidentate ligand containing a halogen atom and having an acetylacetone skeleton is preferred because of its excellent initial luminescent properties.

Examples of the lanthanoid complex with a bidentate ligand containing a halogen atom and having an acetylacetone skeleton include $Eu(TFA)_3phen$, $Eu(TFA)_3dpphen$, $Eu(HFA)_3phen$, $[Eu(FOD)_3]bpy$, $[Eu(TFA)_3]tmphen$, and $[Eu(FOD)_3]phen$. The structures of these lanthanoid complexes with a bidentate ligand containing a halogen atom and having an acetylacetone skeleton are shown below.

[Chem. 1]

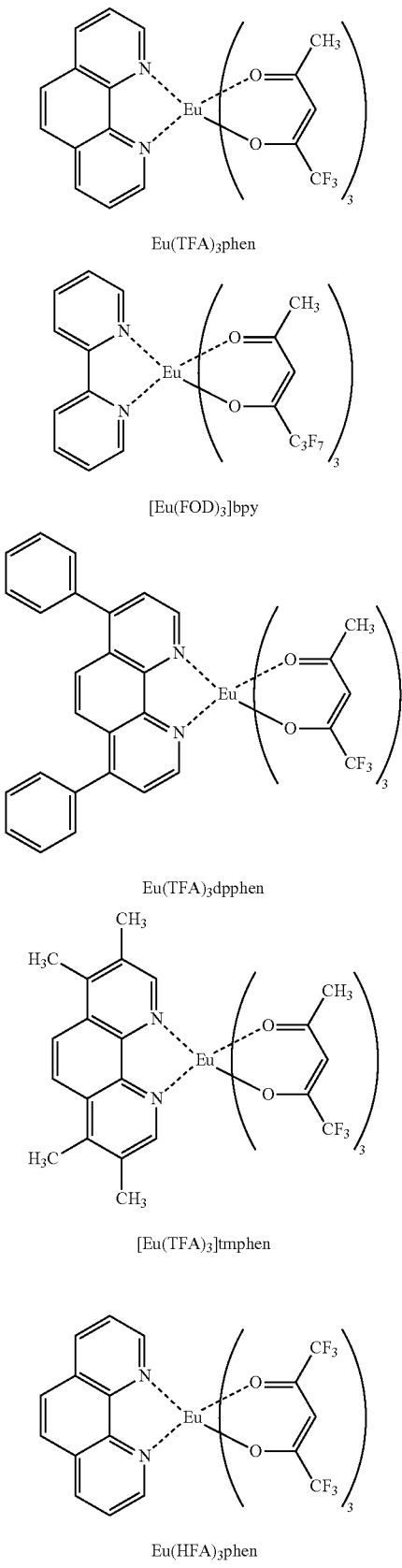

Eu(TFA)₃phen

[Eu(FOD)₃]bpy

Eu(TFA)₃dpphen

[Eu(TFA)₃]tmphen

Eu(HFA)₃phen

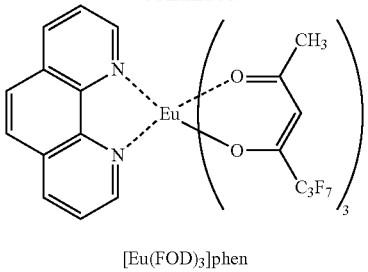

[Eu(FOD)₃]phen

The lanthanoid complex with a bidentate ligand containing a halogen atom or the lanthanoid complex with a tridentate ligand containing a halogen atom is preferably in the form of particles. The lanthanoid complex with a bidentate ligand containing a halogen atom or the lanthanoid complex with a tridentate ligand containing a halogen atom in the form of particles can be readily finely dispersed in the luminescent sheet.

In the case where the lanthanoid complex with a bidentate ligand containing a halogen atom or the lanthanoid complex with a tridentate ligand containing a halogen atom is in the form of particles, the lower limit of the average particle size of the lanthanoid complex is preferably 0.01 μm and the upper limit thereof is preferably 10 μm. The lower limit is more preferably 0.03 μm and the upper limit is more preferably 1 μm.

Examples of the luminescent material having a terephthalic acid ester structure include compounds having a structure represented by the formula (1) and compounds having a structure represented by the formula (2).

These may be used alone or in combination of two or more thereof.

[Chem. 2]

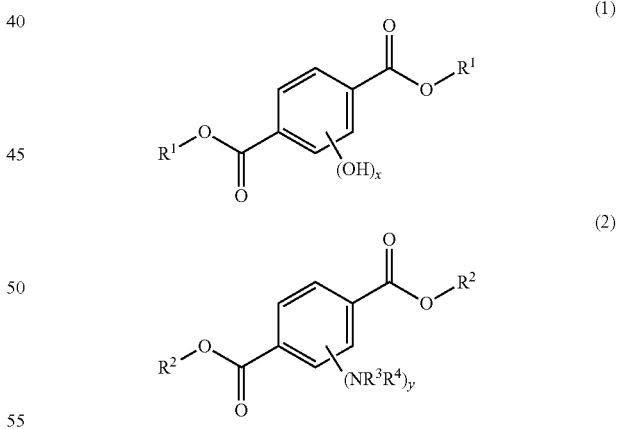

In the formula (1), $R^1$ is an organic group and x is 1, 2, 3, or 4.

For higher transparency of the luminescent sheet, x is preferably 1 or 2, and the luminescent material has a hydroxy group more preferably at 2 or 5 position of the benzene ring, still more preferably at 2 and 5 positions of the benzene ring.

The organic group of $R^1$ is preferably a hydrocarbon group, more preferably a C1-C10 hydrocarbon group, still more preferably a C1-C5 hydrocarbon group, particularly preferably a C1-C3 hydrocarbon group.

When the hydrocarbon group has 10 or less carbon atoms, the luminescent material having a terephthalic acid ester structure can be easily dispersed in the luminescent sheet.

The hydrocarbon group is preferably an alkyl group.

Examples of the compound having a structure represented by the formula (1) include diethyl-2,5-dihydroxyterephthalate and dimethyl-2,5-dihydroxyterephthalate.

In particular, for display of an image at higher contrast, the compound having a structure represented by the formula (1) is preferably diethyl-2,5-dihydroxylterephthalate ("diethyl 2,5-dihydroxyterephthalate" available from Sigma-Aldrich).

In the formula (2), $R^2$ is an organic group, $R^3$ and $R^4$ each are a hydrogen atom or an organic group, and y is 1, 2, 3, or 4.

The organic group of $R^2$ is preferably a hydrocarbon group, more preferably a C1-C10 hydrocarbon group, still more preferably a C1-C5 hydrocarbon group, particularly preferably a C1-C3 hydrocarbon group.

When the hydrocarbon group has a carbon number satisfying the upper limit, the luminescent material having a terephthalic acid ester structure can be easily dispersed in the luminescent sheet.

The hydrocarbon group is preferably an alkyl group.

In the formula (2), $NR^3R^4$ is an amino group.

$R^3$ and $R^4$ each are preferably a hydrogen atom.

The benzene ring in the compound having a structure represented by the formula (2) may have the amino group(s) at the position(s) of one hydrogen atom, two hydrogen atoms, three hydrogen atoms, or four hydrogen atoms among hydrogen atoms of the benzene ring.

For display of an image at higher contrast, the compound having a structure represented by the formula (2) is preferably diethyl-2,5-diaminoterephthalate (Sigma-Aldrich).

The amount of the luminescent material in the luminescent sheet may be appropriately adjusted according to the type of the luminescent material. The lower limit of the amount of the luminescent material relative to 100 parts by weight of the thermoplastic resin is preferably 0.001 parts by weight and the upper limit thereof is preferably 10 parts by weight. When the amount of the luminescent material is within this range, the luminescent material used in combination with the pigment can provide excellent aesthetic appearances. The lower limit of the amount of the luminescent material is more preferably 0.01 parts by weight and the upper limit thereof is more preferably 8 parts by weight. The lower limit is still more preferably 0.1 parts by weight and the upper limit is still more preferably 5 parts by weight.

The luminescent sheet may further contain a plasticizer.

Any plasticizer may be used, and examples thereof include organic ester plasticizers such as monobasic organic acid esters and polybasic organic acid esters, and phosphoric acid plasticizers such as organophosphate plasticizers and organophosphite plasticizers. The plasticizer is preferably a liquid plasticizer.

Any monobasic organic acid ester may be used, and examples thereof include glycol esters obtained by a reaction between a glycol and a monobasic organic acid. Examples of the glycol include triethylene glycol, tetraethylene glycol, and tripropylene glycol. Examples of the monobasic organic acid include butyric acid, isobutyric acid, caproic acid, 2-ethylbutyric acid, heptylic acid, n-octylic acid, 2-ethylhexylic acid, pelargonic acid (or n-nonylic acid), and decylic acid. In particular, preferred are triethylene glycol dicaproate, triethylene glycol-di-2-ethylbutyrate, triethylene glycol-di-n-octylate, and triethylene glycol-di-2-ethylhexylate.

Any polybasic organic acid ester may be used, and examples thereof include ester compounds of a polybasic organic acid (e.g., adipic acid, sebacic acid, azelaic acid) with a C4-C8 linear or branched alcohol. In particular, preferred are dibutyl sebacate, dioctyl azelate, and dibutyl carbitol adipate.

Any organic ester plasticizer may be used, and examples thereof include triethylene glycol di-2-ethylbutyrate, triethylene glycol di-2-ethylhexanoate, triethylene glycol dicaprylate, triethylene glycol di-n-octanoate, triethylene glycol di-n-heptanoate, tetraethylene glycol di-n-heptanoate, tetraethylene glycol di-2-ethylhexanoate, dibutyl sebacate, dioctyl azelate, dibutyl carbitol adipate, ethylene glycol di-2-ethylbutyrate, 1,3-propylene glycol di-2-ethylbutyrate, 1,4-butylene glycol di-2-ethylbutyrate, diethylene glycol di-2-ethylbutyrate, diethylene glycol di-2-ethylhexanoate, dipropylene glycol di-2-ethylbutyrate, triethylene glycol di-2-ethylpentanoate, tetraethylene glycol di-2-ethylbutyrate, diethylene glycol dicapriate, dihexyl adipate, dioctyl adipate, hexylcyclohexyl adipate, diisononyl adipate, heptylnonyl adipate, dibutyl sebacate, oil-modified alkyd sebacate, mixtures of phosphoric acid esters and adipic acid esters, adipic acid esters, mixed type adipic acid esters prepared from C4-C9 alkyl alcohols and C4-C9 cyclic alcohols, and C6-C8 adipic acid esters such as hexyl adipate.

Any organophosphate plasticizer may be used, and examples thereof include tributoxyethyl phosphate, isodecylphenyl phosphate, and triisopropyl phosphate.

Among these, the plasticizer is preferably at least one selected from the group consisting of dihexyl adipate (DHA), triethylene glycol di-2-ethylhexanoate (3GO), tetraethylene glycol di-2-ethylhexanoate (4GO), triethylene glycol di-2-ethylbutyrate (3GH), tetraethylene glycol di-2-ethylbutyrate (4GH), tetraethylene glycol di-n-heptanoate (4G7), and triethylene glycol di-n-heptanoate (3G7).

For less hydrolysis, the plasticizer preferably contains triethylene glycol di-2-ethylhexanoate (3GO), triethylene glycol di-2-ethylbutyrate (3GH), tetraethylene glycol di-2-ethylhexanoate (4GO), or dihexyl adipate (DHA), more preferably tetraethylene glycol di-2-ethylhexanoate (4GO) or triethylene glycol di-2-ethylhexanoate (3GO), still more preferably triethylene glycol di-2-ethylhexanoate.

The amount of the plasticizer in the luminescent sheet is not particularly limited. The lower limit thereof is preferably 30 parts by weight and the upper limit thereof is preferably 100 parts by weight relative to 100 parts by weight of the thermoplastic resin. When the amount of the plasticizer is within this range, the luminescent sheet is easily formed without impairing the aesthetic appearances of the luminescent sheet. The lower limit of the amount of the plasticizer is more preferably 35 parts by weight and the upper limit thereof is more preferably 80 parts by weight. The lower limit is still more preferably 45 parts by weight and the upper limit is still more preferably 70 parts by weight. The lower limit is particularly preferably 50 parts by weight and the upper limit is particularly preferably 63 parts by weight.

The luminescent sheet preferably contains an adhesion modifier.

The adhesion modifier used is suitably, for example, an alkali metal salt or an alkaline earth metal salt. Examples of the adhesion modifier include salts of potassium, sodium, magnesium, and the like.

Examples of acids constituting the salts include organic acids such as carboxylic acids (e.g., octylic acid, hexylic acid, 2-ethylbutyric acid, butyric acid, acetic acid, formic acid) and inorganic acids such as hydrochloric acid and nitric acid.

The luminescent sheet may contain, in addition to the adhesion modifier, potassium, sodium, and magnesium derived from raw materials (e.g., a neutralizing agent) used in production of the thermoplastic resin. When these metals are contained in a large amount, the luminescent properties of the luminescent material may be reduced. Such a reduction in the luminescent properties is particularly noticeable when the luminescent material is a lanthanoid complex with a bidentate ligand containing a halogen atom or a lanthanoid complex with a tridentate ligand containing a halogen atom.

Thus, the total amount of potassium, sodium, and magnesium contained in the luminescent sheet is preferably 50 ppm or less. When the total amount of potassium, sodium, and magnesium is 50 ppm or less, the reduction in the luminescent properties of the luminescent material can be prevented.

The luminescent sheet preferably further contains a dispersant. The use of a dispersant can inhibit aggregation of the luminescent material.

The dispersant used may be, for example, a compound having a sulfonic acid structure such as linear alkyl benzene sulfonates; a compound having an ester structure such as diester compounds, ricinoleic acid alkyl esters, phthalic acid esters, adipic acid esters, sebacic acid esters, and phosphoric acid esters; a compound having an ether structure such as polyoxyethylene glycols, polyoxypropylene glycols, and alkyl phenyl-polyoxyethylene-ethers; a compound having a carboxylic acid structure such as polycarboxylic acids; a compound having an amine structure such as laurylamine, dimethyllaurylamine, oleyl propylenediamine, polyoxyethylene secondary amine, polyoxyethylene tertiary amine, and polyoxyethylene diamine; a compound having a polyamine structure such as polyalkylene polyamine alkylene oxide; a compound having an amide structure such as oleic acid diethanolamide and alkanol fatty acid amide; and a compound having a high-molecular-weight amide structure such as polyvinylpyrrolidone and polyester acid amidoamine salt. Also, the dispersant used may be a high-molecular-weight dispersant such as polyoxyethylene alkyl ether phosphoric acid (salt), high-molecular-weight polycarboxylic acids, and condensed ricinoleic acid esters. The high-molecular-weight dispersant is defined as a dispersant having a molecular weight of 10,000 or higher.

In the case where the luminescent material is a lanthanoid complex with a bidentate ligand containing a halogen atom or a lanthanoid complex with a tridentate ligand containing a halogen atom, the lower limit of the amount of the dispersant relative to 100 parts by weight of the luminescent material in the luminescent sheet is preferably 1 part by weight and the upper limit thereof is preferably 50 parts by weight. When the amount of the dispersant is within the above range, the lanthanoid complex with a bidentate ligand containing a halogen atom or the lanthanoid complex with a tridentate ligand containing a halogen atom can be uniformly dispersed in the luminescent sheet. The lower limit of the amount of the dispersant is more preferably 3 parts by weight and the upper limit thereof is more preferably 30 parts by weight. The lower limit is still more preferably 5 parts by weight and the upper limit is still more preferably 25 parts by weight.

The luminescent sheet may contain additives such as an ultraviolet absorber, an antioxidant, a light stabilizer, an antistatic agent, a blue pigment, a blue dye, a green pigment, and a green dye, as needed.

The luminescent curved glass of the present invention, despite being curved with a small radius of curvature, can provide a clear display on its entire surface when irradiated with excitation light for the luminescent material. Thus, the luminescent curved glass can be suitably used in complex-shaped digital signage having high design quality and digital signage utilizing a building pillar.

The present invention also encompasses curved digital signage including a light source and the luminescent curved glass of the present invention.

Advantageous Effects of Invention

The present invention can provide a luminescent curved glass which, despite being curved with a small radius of curvature, can provide a clear display on its entire surface when irradiated with light, and curved digital signage including the luminescent curved glass.

BRIEF DESCRIPTION OF DRAWINGS

FIG. 1 is a schematic view illustrating a method for displaying character information in evaluation of examples and comparative examples.

DESCRIPTION OF EMBODIMENTS

The present invention is more specifically described in the following with reference to, but not limited to, examples.

Example 1

(1) Preparation of $Eu(TFA)_3phen$

Europium acetate ($Eu(CH_3COO)_3$) in an amount of 12.5 mmol was dissolved in 50 mL of distilled water. To the solution was added 33.6 mmol of trifluoroacetylacetone (TFA, $CH_3COCH_2COCF_3$), and the mixture was stirred at room temperature for 3 hours. The mixture was filtered to obtain precipitated solid. The precipitated solid was washed with water, and recrystallized using methanol and distilled water to give $Eu(TFA)_3(H_2O)_2$. Then, 5.77 g of the resulting complex ($Eu(TFA)_3(H_2O)_2$) and 2.5 g of 1,10-phenanthroline (phen) were dissolved in 100 mL of methanol, followed by heating under reflux for 12 hours. After 12 hours, methanol was distilled off under reduced pressure, thereby obtaining a white product. The white product powder was washed with toluene so that unreacted materials were removed by suction filtration. Subsequently, toluene was distilled off under reduced pressure, thereby preparing a powder. Through recrystallization using a solvent mixture of toluene and hexane, $Eu(TFA)_3phen$ was obtained.

(2) Preparation of Luminescent Sheet

To 40 parts by weight of triethylene glycol di-2-ethyl-hexanoate (3GO) as a plasticizer were added 0.2 parts by weight of $Eu(TFA)_3phen$ as a luminescent material and acetylacetone magnesium in an amount giving a final concentration of 0.036 phr as an adhesion modifier, whereby a luminescent plasticizer solution was prepared. The entire amount of the plasticizer solution obtained and 100 parts by weight of polyvinyl butyral (PVB, degree of polymerization: 1700) were sufficiently mixed and kneaded using a mixing roll to prepare a resin composition.

The obtained resin composition was extruded using an extruder to provide a luminescent sheet having a thickness of 760 µm.

(3) Production of Luminescent Curved Glass

The obtained luminescent sheet was interposed between a pair of clear glass plates (thickness: 2.5 mm, curved with a radius of curvature of 3,000 mm) to prepare a laminate. The laminate was pressed under vacuum at 90° C. for 30 minutes to be press-bonded using a vacuum laminator. The press-bonded laminate was subjected to another 20-minute press-bonding under 14 MPa at 140° C. using an autoclave, thereby obtaining a luminescent curved glass having a laminated glass structure.

Example 2

A luminescent sheet and a luminescent curved glass were produced as in Example 1 except that a pair of clear glass plates each having a thickness of 2.5 mm and a radius of curvature of 2,000 mm was used.

Example 3

A luminescent sheet and a luminescent curved glass were produced as in Example 1 except that a pair of clear glass plates each having a thickness of 2.5 mm and a radius of curvature of 1,000 mm was used.

Example 4

Terbium acetate ($Tb(CH_3COO)_3$) in an amount of 12.5 mmol was dissolved in 50 mL of distilled water. To the solution was added 33.6 mmol of trifluoroacetylacetone (TFA, $CH_3COCH_2COCF_3$), and the mixture was stirred at room temperature for 3 hours. The mixture was filtered to obtain precipitated solid, and the precipitated solid was washed with water, and recrystallized using methanol and distilled water to give $Tb(TFA)_3(H_2O)_2$. Then, 5.77 g of the resulting complex ($Tb(TFA)_3(H_2O)_2$) and 2.5 g of 1,10-phenanthroline (phen) were dissolved in 100 mL of methanol, followed by heating under reflux for 12 hours. After 12 hours, methanol was distilled off under reduced pressure, thereby obtaining a white product. The white product powder was washed with toluene and unreacted materials were removed by suction filtration. Subsequently, toluene was distilled off under reduced pressure, thereby preparing a powder. Through recrystallization using a solvent mixture of toluene and hexane, $Tb(TFA)_3phen$ was obtained.

A luminescent sheet and a luminescent curved glass were produced as in Example 1 except that $Tb(TFA)_3phen$ was used instead of $Eu(TFA)_3phen$.

Example 5

A luminescent sheet and a luminescent curved glass were produced as in Example 1 except that diethyl-2,5-dihydroxyterephthalate (available from Sigma-Aldrich, "diethyl 2,5-dihydroxyterephthalate") was used instead of $Eu(TFA)_3phen$.

Comparative Example 1

A resin sheet and a curved glass were produced as in Example 1 except that no luminescent material was used.

(Evaluation)

The luminescent curved glasses obtained in the examples and comparative examples were evaluated by the following methods.

Table 1 shows the results.

As shown in FIG. 1, each of the luminescent curved glasses obtained in the examples was irradiated with light having a wavelength of 405 nm and an output power of 1 mW from the side of the center point of the curved surface using an image projector (available from Opus Microsystems Corp., ePro-2000) as an excitation light source. The luminescent material was thus allowed to emit light to display "A" characters on nine sites as character information.

Separately, the curved glass obtained in Comparative Example 1 was irradiated with green light having a wavelength of 515 nm from the side of the center point of the curved surface using an image projector (available from Opus Microsystems Corp., ePro-2000), so that the curved glass displayed "A" characters on nine sites as character information.

Each "A" character was visually observed. A rating of "○ (Good)" was given when less than five "A" characters were distorted. A rating of "x (Poor)" was given when five or more "A" characters were distorted.

TABLE 1

|  |  |  |  | Example 1 | Example 2 | Example 3 | Example 4 | Example 5 | Comparative Example 1 |
|---|---|---|---|---|---|---|---|---|---|
| Luminescent sheet formulation | PVB |  | phr | 100 | 100 | 100 | 100 | 100 | 100 |
|  | 3GO |  | phr | 40 | 40 | 40 | 40 | 40 | 40 |
|  | Luminescent material | $Eu(TFA)_3phen$ | phr | 0.2 | 0.2 | 0.2 | — | — | — |
|  |  | $Tb(TFA)_3phen$ | phr | — | — | — | 0.2 | — | — |
|  |  | Diethyl 2,5-dihydroxyterephthalate | phr | — | — | — | — | 0.2 | — |
|  | Adhesion modifier | Acetylacetone magnesium | phr | 0.036 | 0.036 | 0.036 | 0.036 | 0.036 | 0.036 |
| Radius of curvature of transparent plate |  |  | mm | 3000 | 2000 | 1000 | 3000 | 3000 | 3000 |
| Evaluation | Distortion of character information |  | — | ○ | ○ | ○ | ○ | ○ | X |

INDUSTRIAL APPLICABILITY

The present invention can provide a luminescent curved glass which, despite being curved with a small radius of curvature, can provide a clear display on its entire surface when irradiated with light, and curved digital signage including the luminescent curved glass.

The invention claimed is:

1. A luminescent curved glass comprising
a laminate including a transparent plate having a thickness of 1.5 mm to 15 mm and a radius of curvature of 3,000 mm or lower, and a luminescent sheet,
wherein the luminescent sheet contains a thermoplastic resin, a luminescent material that emits visible light having a wavelength of 380 to 750 nm under excitation light, and a plasticizer,
the thermoplastic resin is a polyvinyl acetal resin and/or an ethylene-vinyl acetate copolymer resin, and
an amount of the luminescent material in the luminescent sheet is 0.001 parts by weight or more and 10 parts by weight or less relative to 100 parts by weight of the thermoplastic resin.

2. The luminescent curved glass according to claim 1, wherein the transparent plate has a radius of curvature of 2,000 mm or lower.

3. The luminescent curved glass according to claim 1, wherein the transparent plate has a radius of curvature of 1,000 mm or lower.

4. The luminescent curved glass according to claim 1, wherein
the laminate includes a pair of the transparent plates and the luminescent sheet interposed between the transparent plates.

5. A curved digital signage comprising:
a light source; and
the luminescent curved glass according to claim 1.

6. The curved digital signage according to claim 5, wherein the laminate in the luminescent curved glass includes a pair of the transparent plates and the luminescent sheet interposed between the transparent plates.

7. A building comprising the curved digital signage according to claim 5.

8. A pillar of a building, the pillar comprising the curved digital signage according to claim 5.

9. The luminescent curved glass according to claim 1, wherein an amount of the plasticizer in the luminescent sheet is 30 parts by weight or more and 100 parts by weight or less relative to 100 parts by weight of the thermoplastic resin.

* * * * *